United States Patent [19]

Murdock et al.

[11] 4,025,215
[45] May 24, 1977

[54] CORNER DOVETAIL JOINT

[75] Inventors: Marshall B. Murdock; Howard E. Bollinger, both of Lenoir, N.C.

[73] Assignee: Broyhill Industries, Lenoir, N.C.

[22] Filed: Jan. 26, 1976

[21] Appl. No.: 652,559

[52] U.S. Cl. .............................. 403/381; 403/382
[51] Int. Cl.² ....................................... F16B 12/00
[58] Field of Search .......... 403/381, 382, 401, 231, 403/403; 52/753 T, 753 D

[56] References Cited

UNITED STATES PATENTS

| | | | |
|---|---|---|---|
| 1,067,910 | 7/1913 | Florey | 403/381 |
| 1,533,099 | 4/1925 | Carroll | 403/231 |

OTHER PUBLICATIONS

Pp. 84–85 of Science Illustrated, Dec. 1948.

*Primary Examiner*—Andrew V. Kundrat

[57] ABSTRACT

In a corner joint construction of the dovetail type, the tenons and mortises on each wall at the end portion extend only partially through the thickness of the walls commencing at the inner portion thereof. The remaining or outer portion of the wall thickness is mitered from the termination of the tenons and mortises outwardly to form abutting, solid end portions which conceal the tenons and mortises therebehind.

1 Claim, 5 Drawing Figures

CORNER DOVETAIL JOINT

BACKGROUND OF THE INVENTION

In the woodworking art, dovetail corner joints are very old and very well known. A dovetail joint is a woodworking technique for joining two boards or walls, generally in end-to-end relationship, in which the adjacent end portions are provided with a plurality of alternating tenons and mortises. Tenons are protruding fingers and mortises are correspondingly shaped grooves which receive the tenons from the opposite workpiece. Dovetailing can also be applied to corner joints wherein the tenons and mortises of one board or wall are arranged perependicular to and interfit with the tenons and mortises of another board. So arranged, the walls may be separated only by a force exerted in one direction, but will resist separation by a force perpendicular thereto. This is helpful in designing furniture in which more stress occurs in a given direction than in a perpendicular direction, such as at rear corners of drawers.

Most dovetail type corner joints have the tenons and mortises of each member cut entirely through the wall thickness thereof, so that the tenons and mortises of both walls are visible from the outside of the joint. A few dovetail type corner joints provide tenons cut in the same way, but the mortises and tenons on one of the walls are "blind". That is, the tenons and mortises extend only partially through the wall thickness of one of the boards, so that when the tenon is inserted into the mortise, the dovetailing effect is visible from the outside of one wall only. When looking at the other wall of the corner, the joint is not visible.

Further, on the partially hidden dovetail joints known previously an entirely separate cutting head is necessary to form the male and female members.

SUMMARY OF THE PRESENT INVENTION

In the present invention, however, first of all, the tenons and mortises of the adjoining wall end portions are formed only partially through the thickness thereof. The remaining wall thickness of each end portion is mitered or beveled at an angle of approximately 45°, so that when assembled, the tenons and mortises are completely obscured without losing the benefit of the dovetail construction. Secondly, the longitudinal axis of the tenons of one wall extend longitudinally of the wall, while in the other wall the longitudinal axis of the tenons is traverse to the wall surface. This permits one tool to form the tenons and mortises of both walls, it only being necessary to turn the workpiece 90° in feeding to the tool to form walls of the other configuration.

Further, the tenons are tapered so that the end portions thereof are larger in cross section than the base portions thereof with the result that the tenons exhibit a frustro-conical configuration when viewed from the side. The mortises are correspondingly oppositely formed with a taper beginning with a thicker portion adjacent an inner wall and tapering to a smaller portion at the other end. So constructed, not only is the joint construction concealed when assembled, but also the assembly may be made in only one direction. That is, while one of the side members will slide perpendicularly to the inner face of the other wall member, the reverse is not true. Therefore, the assembly and disassembly may be made in one direction only, which provides substantial strength of the joint in the other direction.

It is therefore an object of the present invention to provide an improvement in corner joint constructions of the dovetail type.

It is further an object of the present invention to provide a dovetail corner joint construction wherein the tenons and mortises forming the dovetail are concealed from view when the corner is observed from the outside thereof.

It is further an object of the present invention to provide a dovetail type corner construction of the type described, in which the tenons and mortises thereof extend only partially through the wall thickness of the boards forming the corner construction with the remaining portion of the wall thickness being mitered to form abutting end portions which conceal the dovetail joint from the outside.

Other objects and a fuller understanding of the invention will become apparent from reading the following detailed description of the preferred embodiment in conjunction with the accompanying drawings in which.

DETAILED DESCRIPTION OF A PREFERRED EMBODIMENT

Figure 1:
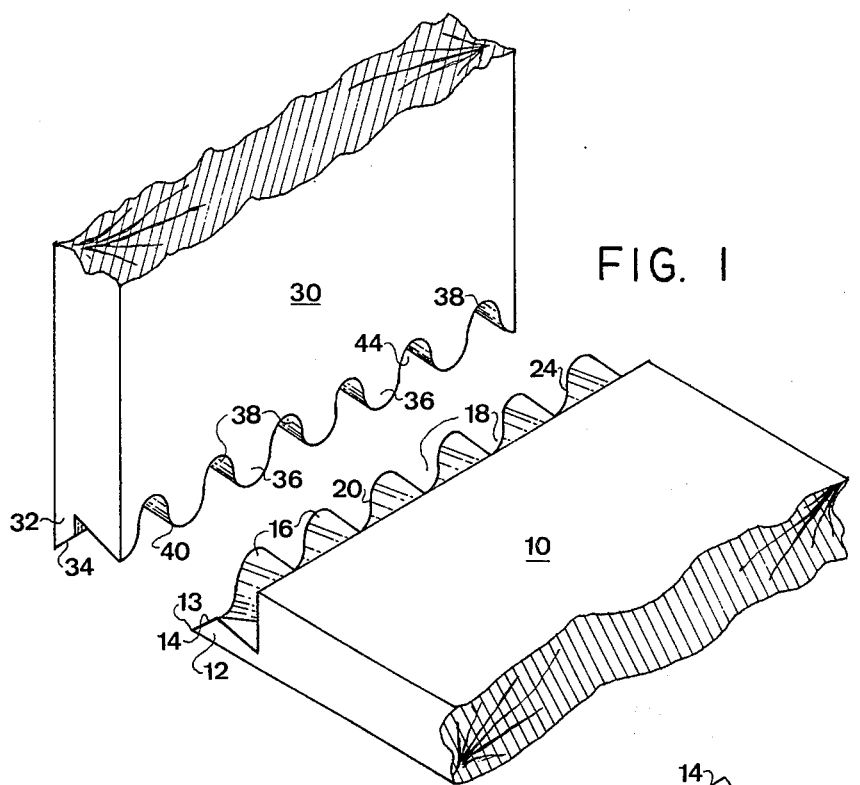
FIG. 1 is a perspective view of the corner joint construction according to the present invention with the walls disassembled and slightly spaced from each other.

Turning now to the drawings, and particularly FIG. 1, there is illustrated the corner joint of the present invention for joining two walls 10, 30 at the end portions thereof. On one of the walls 10 a dovetail locking means is formed by a plurality of longitudinally extending, alternating, tapered tenons 16 and mortises 24 which extend only partially through the wall thickness of the member 10. A beveled outer edge 14 connects a point adjacent the termination of the tenons 16 and the outer edge or corner 13 of the end portion 12.

On the opposing wall 30, a somewhat similar dovetail pattern is formed by a plurality of transversely extending, alternating, tapered tenons 36 and mortises 44. These dovetail shaping members are arranged perpendicular with those on wall 10 and are correspondingly tapered to mate with tenons 16 and mortises 24 of the wall member 10. A bevel 34 similar to bevel 14 extends from a point adjacent the base of tenons 36 to the outer edge or corner of the end portion 32 of wall 30.

So arranged, since the tenons and mortises of each of wall members 10, 30 extend only partially through the wall thickness thereof, when assembled, the dovetail corner joint is completely hidden. Further, this assembly may only be effected by moving wall member 30 vertically with relation to wall member 10 as illustrated in FIG. 1. Movement of wall member 10 horizontally to the right, or perpendicularly away from wall member 30 in a lateral direction cannot be accomplished because of the aforementioned, tapered tenons and mortises. Therefore, if wall member 10 is used as a side wall of a drawer and wall member 30 as the front or rear wall of the drawer, opening and closing of the drawer will not tend to weaken the corner joints.

Figure 2:
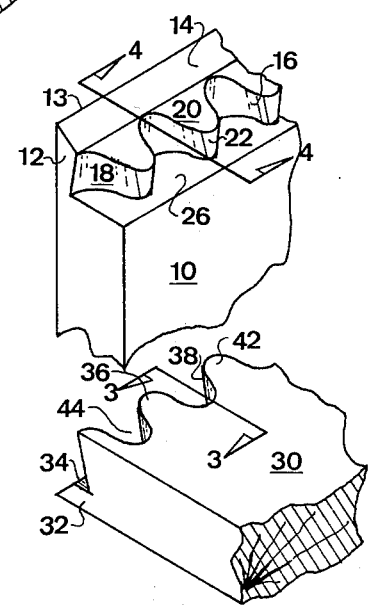
FIG. 2 is an enlarged, exploded perspective view illustrating a segment of the end portions of the two walls forming the corner joint construction.
Figure 5:
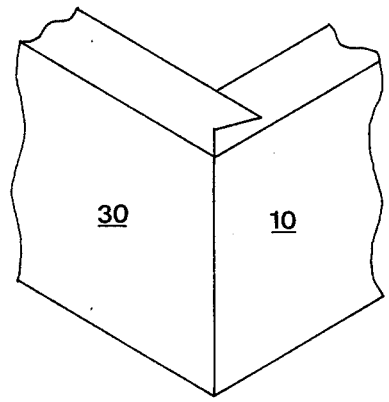
FIG. 5 is a perspective view illustrating the assembled corner joint of the present invention, looking from the outside thereof.
Figure 3:
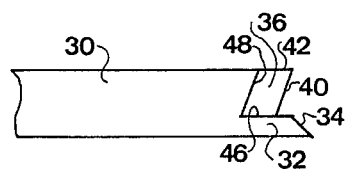
FIG. 3 is a sectional view taken substantially along lines 3—3 in FIG. 2.
Figure 4:
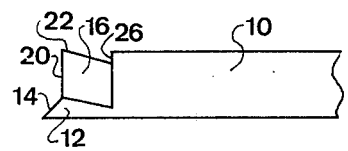
FIG. 4 is a sectional view taken substantially along lines 4—4 in FIG. 2.

Looking now more specifically to the end structure of wall member 10, the cutting away of tenons 16 and mortises 24 forms a lower, end ledge 12 with tenons 16 extending upwardly therefrom. The remainder of the wall thickness is beveled outwardly and downwardly toward the end edge 13 of wall 10 at an angle of approximately 45°. Referring to FIGS. 2 and 4, the tenons 16 and mortises 24 are so cut that the opposite side walls 18 of each tenon converge from end wall 20 back toward the base 26 of the cut portion. At the same time side wall 18 is so tapered that opposite side walls 18 of each tenon 16 diverge downwardly from the upper wall 22 toward ledge 12. The upper wall 22 is tapered downwardly from front wall 20 back toward the base wall 26, and the end or front wall 20 is flat and perpendicular to the base wall 26.

The other wall member 30 is formed by introducing a workpiece to the same cutting tool which forms the dovetail pattern in wall 10. The only difference is that the workpiece which forms wall 30 is introduced in a direction perpendicular to the direction in which wall 10 is introduced. So fabricated, wall 30 includes a plurality of alternating tenons 36 and mortises 44 cut transversely through a portion of the thickness thereof with a bevelled surface 34 cut in the remaining thickness to the outer wall surface. Tenons 36 therefore form a flat outer surface or upper wall 42 which is colinear with the inner surface of wall 30. Side walls 38 of each tenon are so tapered as to converge in a direction beginning with outer wall 42 and heading toward the base surface 46, and also diverge beginning at end wall 40 and heading in a direction back toward the main portion of wall 30. End walls 40 are tapered inwardly beginning at the top or intersection with wall 42 and heading downwardly toward tapered portion 34. Similarly, the wall 48 between adjacent tenons 36 is tapered inwardly commencing with the inner wall surface of wall 30 and heading in a direction toward the base 46.

It is readily seen that tenons 16 and 36 are generally at least partially frustro-conical in shape with the larger cross-section lying at the outer end thereof; i.e. in tenons 16 the wall 20 is the larger cross-section and in tenons 36 the surface 42 is the larger cross-section.

When assembled, the following surfaces become juxtaposed: flat base 26 of wall 10 engages the top surface 42 of wall 30; front or end wall 20 of wall 10 engages and is colinear with the base 46 of wall 30; tapered tenons 16 of wall 10 are received by the mortises 44 of wall 30, while tenons 36 of wall 30 are received within the mortises 24 of wall 10; and finally the bevelled surfaces 14 of wall 10 and 34 of wall 30 are joined in mating arrangement, which cause the dovetail relationship to be obscured from the outside of the corner connection.

It is apparent that various modifications and improvements might be made to the structure of the present invention set forth hereinabove without departing from the scope thereof, which is to be determined by the following claims in which:

What is claimed is:

1. A corner joint construction comprising:
   a. a pair of walls having inner and outer surfaces and being arranged perpendicular to each other and intersecting at adjacent end portions thereof;
   b. each of said adjacent end portions include a dovetail locking means interfitting with each other when assembled, formed in the inner surface of said walls and extending only partially through the wall thickness thereof, said locking means further including
      i. a transverse base surface extending partially through the thickness of a first one of said wall members adjacent to, but slightly spaced from the end thereof, a plurality of alternating, tapered tenons and mortises extending longitudinally from said base surface toward the end of said wall member, the larger cross-section of said tenons being nearest the outer end thereof whereby said tenons are generally frustro-conical in shape, the transverse cross-section of both said mortises and said tenons being curved in substantially a sinuous pattern, and the base of said tenons being spaced from the inner surface of said side wall to form an undercut;
      ii. a longitudinal base surface portion intermediate the inner and outer wall surfaces of said second wall member; a plurality of alternating, tapered tenons and mortises extending from said base surface in a direction transverse to the longitudinal dimension of said second side wall member, the side walls of said tenons being separated the greatest at the inner surface of said second wall member and converging inwardly toward said base surface whereby said tenons are generally frustro-conical, the cross-section of said tenons and mortises being curved in substantially a sinuous pattern;
   c. a concealing means comprising a bevel in both of said wall members extending from the outer corner of each wall inwardly to the termination of said dovetail locking means;
   d. whereby said dovetail locking means is completely concealed from view when the outer or inner corner of the joint construction is observed.

* * * * *